(12) United States Patent
Kim et al.

(10) Patent No.: US 10,979,645 B2
(45) Date of Patent: Apr. 13, 2021

(54) VIDEO CAPTURING DEVICE INCLUDING CAMERAS AND VIDEO CAPTURING SYSTEM INCLUDING THE SAME

(71) Applicant: HANWHA TECHWIN CO., LTD., Seongnam-Si (KR)

(72) Inventors: Sunmi Kim, Seongnam-Si (KR); Daesang Kim, Seongnam-Si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/670,583

(22) Filed: Oct. 31, 2019

(65) Prior Publication Data

US 2020/0145585 A1    May 7, 2020

(30) Foreign Application Priority Data

Nov. 1, 2018   (KR) ........................ 10-2018-0132671

(51) Int. Cl.
*H04N 5/232*   (2006.01)
*H04N 17/00*   (2006.01)

(52) U.S. Cl.
CPC ..... *H04N 5/23299* (2018.08); *H04N 5/23216* (2013.01); *H04N 5/23238* (2013.01); *H04N 17/002* (2013.01)

(58) Field of Classification Search
CPC .......... H04N 5/23299; H04N 5/23216; H04N 5/23238; H04N 17/002
See application file for complete search history.

(56) References Cited

U.S. PATENT DOCUMENTS

| 7,636,105 | B2 |  | 12/2009 | Sun et al. | |
| 7,643,066 | B2 | * | 1/2010 | Henninger, III | G06K 9/00771 348/211.99 |
| 7,796,154 | B2 | * | 9/2010 | Senior | H04N 5/232 348/154 |
| 7,839,431 | B2 | * | 11/2010 | Swarr | G08B 13/19689 348/143 |
| 8,193,909 | B1 | * | 6/2012 | Estes | G08B 13/19641 340/8.1 |
| 8,279,283 | B2 | * | 10/2012 | McCormack | G08B 13/196 348/135 |
| 8,289,392 | B2 | * | 10/2012 | Senior | H04N 5/232 348/143 |
| 8,537,228 | B2 | * | 9/2013 | Lee | G06F 3/04847 348/153 |

(Continued)

FOREIGN PATENT DOCUMENTS

| KR | 100969576 B1 | 7/2010 |
| KR | 101347450 B1 | 1/2014 |

*Primary Examiner* — Brian P Yenke
(74) *Attorney, Agent, or Firm* — McLean IP Global; Jason Y. Pahng

(57) ABSTRACT

A video capturing device may include a video calibrator connected to one or more fixed cameras and a PTZ camera. The video calibrator may receive a first image captured by the one or more fixed cameras and a second image acquired by performing image capturing while moving the PTZ camera, search an image area matched with the first image within a reference window which is specified in the second image according to a default value associated with an aiming direction of the fixed camera, and output information associated with the searched image area.

20 Claims, 11 Drawing Sheets

(56) References Cited

U.S. PATENT DOCUMENTS

| | | | |
|---|---|---|---|
| 9,030,555 B2* | 5/2015 | Kim | G08B 13/19652 348/143 |
| 9,338,437 B2* | 5/2016 | Bae | H04N 5/23232 |
| 9,392,146 B2* | 7/2016 | Song | H04N 5/23229 |
| 9,418,320 B2* | 8/2016 | Chang | G06T 7/337 |
| 9,436,894 B2* | 9/2016 | Lee | G06K 9/6289 |
| 9,466,119 B2* | 10/2016 | Bae | G06T 7/20 |
| 9,508,136 B2* | 11/2016 | Lee | G06T 5/50 |
| 9,807,338 B2* | 10/2017 | Cho | H04N 5/77 |
| 9,876,993 B2* | 1/2018 | Sablak | H04N 7/183 |
| 9,984,466 B1* | 5/2018 | Duran | G06T 7/292 |
| 10,044,936 B2* | 8/2018 | Ryu | H04N 5/23261 |
| 10,073,324 B2* | 9/2018 | Lim | G03B 15/03 |
| 10,084,977 B2* | 9/2018 | Cho | H04N 5/2254 |
| 10,136,063 B2* | 11/2018 | Ryu | G06K 9/6211 |
| 10,235,747 B2* | 3/2019 | Kennedy | G06T 7/00 |
| 10,334,150 B2* | 6/2019 | Kim | H04N 5/23296 |
| 10,382,725 B2* | 8/2019 | Jung | H04N 5/2253 |
| 10,417,357 B2* | 9/2019 | Franklin | A61B 34/10 |
| 10,430,972 B2* | 10/2019 | Dahlstrom | G08B 13/1963 |
| 10,671,857 B2* | 6/2020 | Pan | G06K 9/00771 |
| 2004/0100563 A1* | 5/2004 | Sablak | H04N 5/23216 348/211.4 |
| 2005/0190972 A1* | 9/2005 | Thomas | G06K 9/209 382/218 |
| 2005/0206726 A1* | 9/2005 | Yoshida | H04N 7/181 348/143 |
| 2006/0197839 A1* | 9/2006 | Senior | H04N 5/232 348/169 |
| 2006/0203098 A1* | 9/2006 | Henninger, III | G08B 13/19686 348/211.99 |
| 2007/0115358 A1* | 5/2007 | McCormack | G06T 7/80 348/159 |
| 2007/0196016 A1* | 8/2007 | Chen | G06T 7/80 382/190 |
| 2008/0094480 A1* | 4/2008 | Swarr | G06T 7/80 348/211.99 |
| 2008/0122958 A1* | 5/2008 | Huseth | G08B 13/19689 348/262 |
| 2008/0218587 A1* | 9/2008 | Glatt | G08B 13/1968 348/39 |
| 2008/0259179 A1* | 10/2008 | Senior | H04N 5/247 348/222.1 |
| 2009/0160936 A1* | 6/2009 | McCormack | H04N 5/23238 348/143 |
| 2010/0033567 A1* | 2/2010 | Gupta | H04N 17/002 348/143 |
| 2012/0081552 A1* | 4/2012 | Sablak | H04N 7/183 348/169 |
| 2012/0169882 A1* | 7/2012 | Millar | H04N 7/181 348/159 |
| 2012/0327246 A1* | 12/2012 | Senior | H04N 5/232 348/159 |
| 2013/0258115 A1* | 10/2013 | Hansson | H04N 5/232 348/187 |
| 2017/0048436 A1* | 2/2017 | Chen | H04N 5/23216 |
| 2018/0173704 A1* | 6/2018 | Ihara | H04N 7/181 |
| 2018/0173965 A1* | 6/2018 | Pan | G08B 13/19613 |
| 2018/0302614 A1* | 10/2018 | Toksvig | G06T 7/55 |
| 2018/0376074 A1* | 12/2018 | Gumpert | G06T 7/292 |
| 2019/0066335 A1* | 2/2019 | Dahlstrom | H04N 5/247 |
| 2019/0082105 A1* | 3/2019 | Yamamoto | H04N 5/23238 |
| 2019/0260947 A1* | 8/2019 | Imazu | H04N 5/23296 |
| 2019/0304137 A1* | 10/2019 | Campbell | H04N 5/23216 |
| 2019/0313010 A1* | 10/2019 | Vounckx | H04N 5/23299 |
| 2019/0313030 A1* | 10/2019 | Yamaguchi | H04N 5/247 |
| 2020/0027242 A1* | 1/2020 | Koyama | B64C 39/024 |
| 2020/0065977 A1* | 2/2020 | Duran | H04N 5/23229 |

* cited by examiner

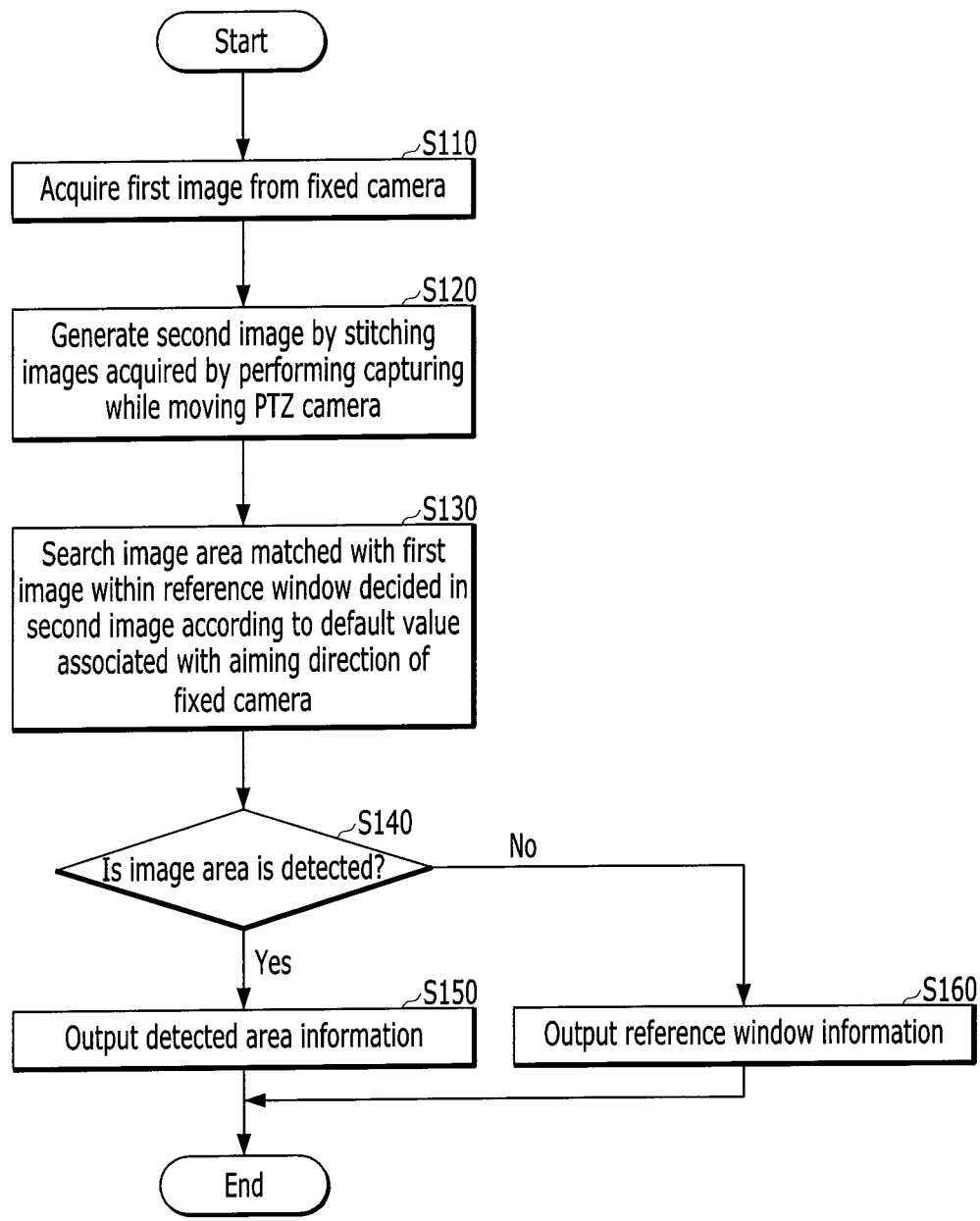

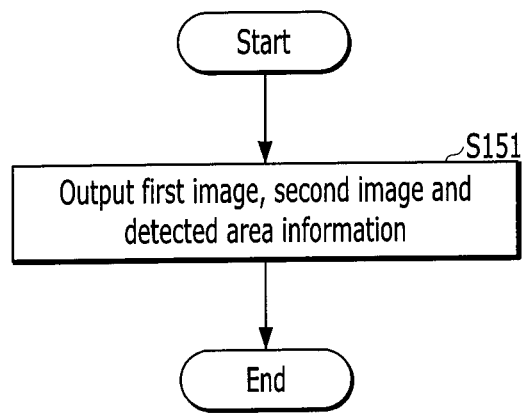
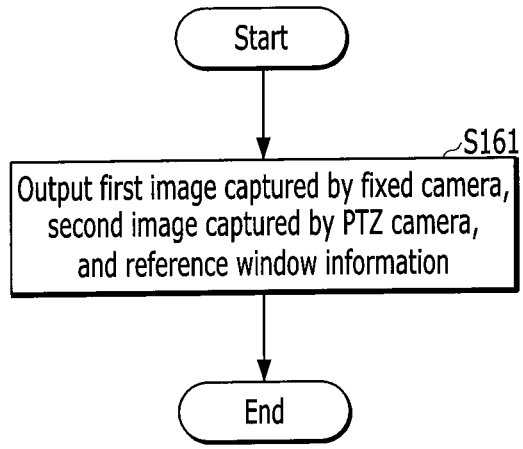

VIDEO CAPTURING DEVICE INCLUDING CAMERAS AND VIDEO CAPTURING SYSTEM INCLUDING THE SAME

CROSS-REFERENCE TO RELATED APPLICATION

This application claims priority to Korean Patent Application No. 10-2018-0132671, filed on Nov. 1, 2019. The aforementioned priority application is hereby incorporated by reference in its entirety for all purposes.

BACKGROUND

1. Technical Field

The present disclosure relates to an electronic device, and more particularly, to a video capturing device including a plurality of cameras and a video capturing system including the same.

2. Related Art

In the intelligent video surveillance field, a variety of researches are being conducted on a surveillance system using dual cameras. When only one fixed camera is used to monitor a wide area, monitoring may need to be performed from a very long distance. Thus, identification for a monitoring target object may be degraded. When only one turning camera is used, the camera cannot monitor another area while tracing one object. When the monitored area is significantly narrowed quickly, the accuracy of the object tracking may be degraded. When the fixed camera and the turning camera are utilized at the same time, surveillance for a wide area and close surveillance for an element of interest can be achieved. Thus, the utilization of both the fixed camera and the turning camera increases the efficiency in terms of the purpose of surveillance. For this reason, research is being actively performed on a surveillance system using dual cameras.

The dual camera system including the fixed camera and the turning camera requires the process of matching a video capturing coordinate associated with the turning camera with a video capturing coordinate associated with the fixed camera. When the matching between the two cameras is accurately performed, correct visual information may be rapidly provided through the cameras.

The above-mentioned contents are provided only to promote understanding of the related art for the technical ideas of the present disclosure. Therefore, the contents should not be understood as contents corresponding to the related art known to those skilled in the art to which the disclosure pertains.

SUMMARY

Various embodiments are directed to a video capturing device capable of matching video coordinates of cameras with high accuracy and a video capturing system including the same.

In an embodiment, a video capturing device may include: one or more fixed cameras; a PTZ (Pan-Tilt-Zoom) camera; and a video calibrator connected to the one or more fixed cameras and the PTZ camera. The video calibrator may receive a first image captured by the one or more fixed cameras, and receive a second image acquired by performing image capturing while moving the PTZ camera. The video calibrator may search an image area matched with the first image within a reference window which is specified in the second image according to a default value associated with an aiming direction of the fixed camera, and output information associated with the searched image area.

The second image may include a panorama image acquired by stitching a plurality of images which are captured while moving the PTZ camera.

The video capturing device may further include: a support member; and a moving member coupled to the one or more fixed cameras and the support member, and configured to adjust the aiming direction by moving the one or more fixed cameras. The default value may be associated with the movement of the one or more fixed cameras.

The video capturing device may further include one or more sensors disposed in the one or more fixed cameras and configured to detect the default value.

The video calibrator may include: a window setting unit configured to define the reference window according to the default value; a feature point detection unit configured to extract feature points from a portion of the second image, corresponding to the reference window, and the first image, respectively; and a feature point comparison unit configured to detect the image area matched with the first image by comparing the extracted feature points.

The video calibrator may map a video coordinate associated with the PTZ camera, corresponding to the searched image area, to a video coordinate associated with the one or more fixed cameras.

When information associated with a change of the searched image area is received from the outside, the video calibrator may map a video coordinate associated with the PTZ camera to a video coordinate associated with the one or more fixed cameras based on the information associated with the change.

The video calibrator may output information associated with the reference window to the outside when the searching of the image area fails, and map a video coordinate associated with the PTZ camera, corresponding to a portion of the reference window, to a video coordinate associated with the one or more fixed cameras, when information for selecting the portion of the reference window is received from the outside.

The video calibrator may receive a third image acquired by performing image capturing while moving the PTZ camera, when the searching of the image area fails, wherein the third image corresponds to the reference window. The video calibrator may search an image area matched with the first image in the third image, and output information associated with the image area matched with the first image in the third image.

In another embodiment, a video capturing system may include: one or more fixed cameras; a PTZ camera; a video calibrator connected to the one or more fixed cameras and the PTZ camera; and a video surveillance device configured to display videos captured by the one or more fixed cameras and the PTZ camera on a display device. The video calibrator may receive a first image captured by the one or more fixed cameras and a second image acquired by performing image capturing while moving the PTZ camera, and search an image area matched with the first image within a reference window which is specified in the second image according to a default value associated with an aiming direction of the fixed camera. When the searching of the image area succeeds, the video surveillance device may display the first image and the second image on the display device, and further highlight and display the searched image area on the second image.

The video surveillance device may further highlight and display the first image. The highlight for the first image may be in the same manner as the highlight for the searched image area.

The video capturing system may further include a user interface. The video surveillance device may display the first and second images on a first area and a second area of the display device, respectively, which are separated from each other, and display the first image to overlap the searched image area when a first user input is received through the user interface.

The first user input may include an input of dragging and dropping the first image into at least a portion of the searched image area.

The first user input may include an input of selecting the first image a plurality of times within a predetermined time period.

The video surveillance device may transmit a command signal to the video calibrator in response to a second user input received through the user interface, with the first image overlapping the searched image area. The video calibrator may map a video coordinate associated with the PTZ camera, corresponding to the searched image area, to a video coordinate associated with the one or more fixed cameras, in response to the command signal.

The video surveillance device may change and display an area corresponding to the first image on the second image in response to the second input received through the user interface, with the first image overlapping the searched image area.

With the area corresponding to the first image changed to be displayed on the second image, the video surveillance device may provide information associated with the change to the video calibrator in response to a third user input received through the user interface. The video calibrator may map a video coordinate associated with the PTZ camera to a video coordinate associated with the one or more fixed cameras, based on the information associated with the change.

When the searching of the image area fails, the video surveillance device may display a first video captured by the one or more fixed cameras and a second video captured by the PTZ camera on the display device, and further highlight and display the reference window on the second video.

The video capturing system may further include a user interface. The video surveillance device may display the first and second videos on a first area and a second area of the display device, respectively, which are separated from each other, and display the first video to overlap the reference window when a first user input is received through the user interface.

The video surveillance device may transmit information on an overlap area between the second video and the first video to the video calibrator, in response to a second user input received through the user interface, with the first image overlapping the reference window. The video calibrator may map a video coordinate associated with the PTZ camera, corresponding to the overlap area between the second video and the first video, to a video coordinate associated with the one or more fixed cameras.

BRIEF DESCRIPTION OF THE DRAWINGS

FIG. 6 is a flowchart illustrating an operating method of a video capturing device in accordance with an embodiment of the disclosure.

FIG. 7 is a flowchart illustrating step S150 of FIG. 6 in more detail.

FIG. 8 is a flowchart illustrating step S160 of FIG. 6 in more detail.

DETAILED DESCRIPTION

Hereafter, exemplary embodiments of the present disclosure will be described in detail with reference to the accompanying drawings. In the following descriptions, only components required for understanding an operation in accordance with an embodiment of the present disclosure will be described. The descriptions of the other components will be ruled out in order not to unnecessarily obscure subject matters of the present disclosure. Furthermore, the present disclosure is not limited to the embodiments described herein, but embodied into other forms. The embodiments described in this specification are only provided to describe the present disclosure in detail, such that the technical idea of the present disclosure can be easily carried out by those skilled in the art to which the present disclosure pertains.

Throughout the specification, when one element is referred to as being "connected or coupled" to another element, it may not only indicate that the former element is "directly connected or coupled" to the latter element, but also indicate that the former element is "indirectly connected or coupled" to the latter element with another element interposed therebetween. The terms used herein are provided to describe specific embodiments, and do not limit the present disclosure. In this specification, when an element "includes or comprises" a component, it may indicate that the element does not exclude another component, but can further include or comprise another component, unless referred to the contrary. "At least any one of X, Y and Z" and "at least any one selected from a group consisting of X, Y and Z" may be analyzed as each of X, Y and Z or a combination of two or more of X, Y and Z (for example, XYZ, XYY, YZ and ZZ). Here, "and/or" includes one or more combinations of corresponding components.

Figure 1:
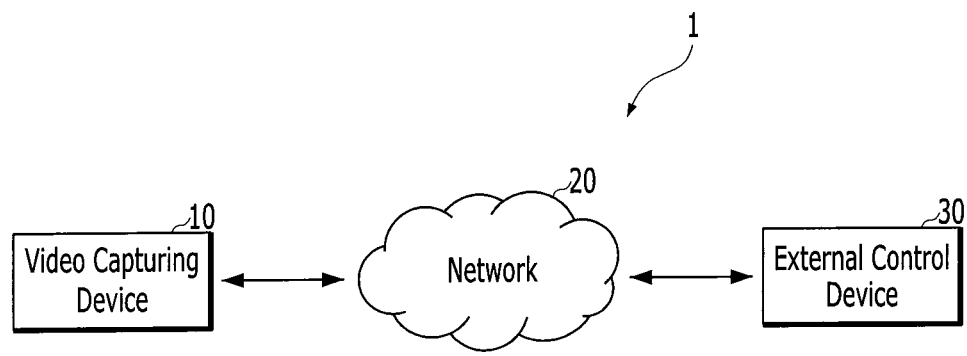
FIG. 1 is a block diagram illustrating a video capturing system including a video capturing device.
Figure 2:
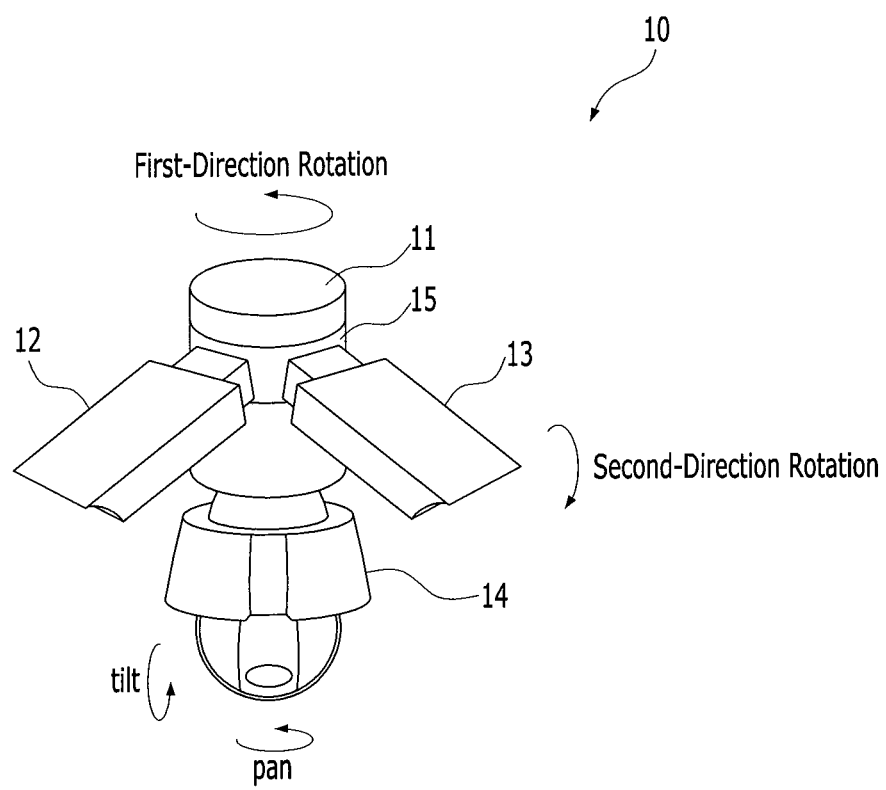
FIG. 2 is a perspective view schematically illustrating the video capturing device of FIG. 1.

FIG. 1 is a block diagram illustrating a video capturing system including a video capturing device. FIG. 2 is a perspective view schematically illustrating the video capturing device of FIG. 1.

Referring to FIG. 1, a video capturing system 1 may include a video capturing device 10, a network 20 and an external control device 30.

The video capturing device 10 is connected to the external control device 30 through the network 20. The video capturing device 10 includes a plurality of cameras. Referring to FIG. 2, the video capturing device 10 includes a support member 11, one or more fixed cameras 12 and 13 and a PTZ (Pan Tilt Zoom) camera 14. FIG. 2 illustrates that the video capturing device 10 includes two fixed cameras 12 and 13.

The PTZ camera 14 may be fixed to the support member 11, and the video capture aiming direction of the PTZ camera can be changed by performing pan/tilt/zoom. The fixed cameras 12 and 13 are fixed to the support member 11. For example, each of the fixed cameras 12 and 13 can perform zoom, but cannot perform pan and tilt.

The video capturing device 10 may further include a moving member 15 through which the fixed cameras 12 and 13 are fixed to the support member 11. The moving member 15 may be configured to adjust the aiming directions of the fixed cameras 12 and 13 by rotating the fixed cameras 12 and 13, respectively. For example, the moving member 15 may rotate the fixed cameras 12 and 13 in a first direction (for example, pan direction). The video capturing device 10 may further include additional moving members such as a hinge, which can rotate the fixed cameras 12 and 13 in a second direction (for example, tilt direction). When or after installing the video capturing device 10 on a building, for example, a user may adjust the aiming directions of the fixed cameras 12 and 13 using the moving member 15, such that the fixed cameras 12 and 13 may video capture area associated with desired video coordinates.

The external control device 30 may communicate with the video capturing device 10 through the network 20. The external control device 30 is configured to display a video transmitted from the video capturing device 10. For example, the external control device 30 may include a module such as a web viewer, which can display the image transmitted from the video capturing device 10 on a display device. The external control device 30 may be a computer device capable of executing the web viewer. In FIG. 1, the external control device 30 is separated from the video capturing device 10. However, the embodiments of the disclosure are not limited thereto. The external control device 30 may be merged with the video capturing device 10.

The external control device 30 and/or the video capturing device 10 may control pan/tilt/zoom of the PTZ camera. In some embodiments, in response to a user input of selecting a portion of a video captured by the fixed camera, the external control device 30 may control pan/tilt/zoom of the PTZ camera to capture the selected portion of the video. For example, because a video coordinate associated with the PTZ camera is calibrated in association with a video coordinate associated with the fixed camera, the external control device 30 may receive the user input of selecting the portion of the video captured by the fixed camera, and the video capturing device 10 may identify a video coordinate associated with the PTZ camera, corresponding to the selected portion, and pan, tilt or zoom the PTZ camera to video capture the area of the identified video coordinate associated with the PTZ camera. When the video coordinate associated with the PTZ camera is accurately calibrated in association with the video coordinate associated with the fixed camera, the video capturing device 10 may track and video capture the selected portion with high reliability, using the PTZ camera. In some embodiments, when an event is detected from the video captured by the fixed camera, the video capturing device 10 may control pan/tilt/zoom of the PTZ camera to video capture the area where the event is detected. For example, with the video coordinate associated with the PTZ camera calibrated in association with the video coordinate associated with the fixed camera, the video capturing device 10 may detect the video coordinate of the area where the event is detected in the video of the fixed camera, identify the video coordinate associated with the PTZ camera, mapped to the detected video coordinate, and pan, tilt or zoom the PTZ camera to video capture the identified video coordinate of the PTZ camera. In addition, various functions of the video capturing system 1 requires that the video coordinate of the PTZ camera should be accurately calibrated for the video coordinate associated with the fixed camera.

Figure 3:
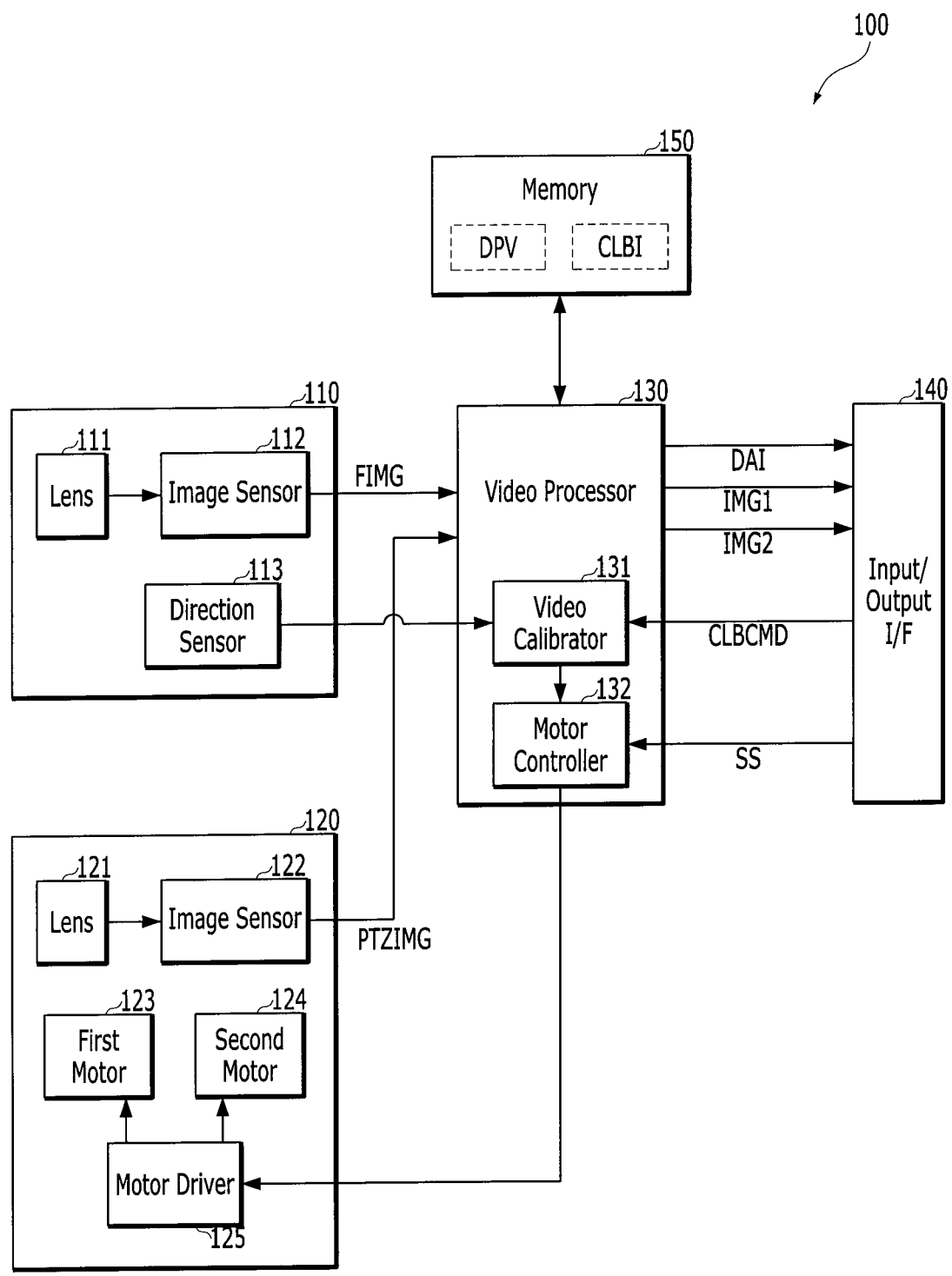
FIG. 3 is a block diagram illustrating a video capturing device in accordance with an embodiment of the disclosure.

FIG. 3 is a block diagram illustrating a video capturing device in accordance with an embodiment of the disclosure.

Referring to FIG. 3, the video capturing device 100 may include one or more fixed cameras 110, a PTZ camera 120, a video processor 130, an input/output interface 140 and a memory 150.

The fixed camera 110 may include one or more lenses 111, an image sensor 112 and a direction sensor 113. The lens 111 may pass light from an object such that an image is focused on an imaging unit. The image sensor 112 senses light having reached the imaging unit, and generates a fixed camera image FIMG.

The direction sensor 113 is configured to output a default value DPV associated with the aiming direction of the fixed camera 110. The video capturing device 100 may include the moving member 15 configured to adjust the aiming direction of the fixed camera 110 by rotating the fixed camera 110 as described with reference to FIG. 2, and the default value DPV may be decided according to the rotational movement of the moving member 15. The direction sensor 113 may include various types of sensors capable of sensing the aiming direction depending on the rotational movement. For example, the direction sensor 113 may include a tilt sensor, an acceleration sensor and an angular velocity sensor.

FIG. 3 illustrates that the direction sensor 113 is included in the fixed camera 110. However, the embodiments of the disclosure are not limited thereto. Various methods for providing the default value DPV may be employed. For example, the direction sensor 113 may be included in the moving member 15 capable of adjusting the aiming direction of the fixed camera 110, and provide the amount of rotation of the moving member 15 as the default value DPV.

The PTZ camera 120 may include one or more lenses 121, an image sensor 122, a first motor 123, a second motor 124 and a motor driver 125. The lens 121 may pass light from an object such that an image is focused on an imaging unit. The image sensor 122 senses light having reached the imaging unit, and generates a PTZ camera image PTZIMG. In some embodiments, each of the image sensors 112 and 122 may be any one of a CCD (Charge Coupled Device) image sensor and a CMOS (Complementary Metal Oxide Semiconductor) image sensor.

The first and second motors 123 and 124 may rotate the PTZ camera 120 in different directions in response to control by the motor driver 125. For example, the first motor 123 may be a pan motor capable of rotating the PTZ camera 120 by 360 degrees in the horizontal direction, and the second motor 124 may be a tilt motor capable of rotating the PTZ camera 120 by 180 degrees in the vertical direction. As the first and second motors 123 and 124 are driven, the video coordinate associated with the PTZ camera 120 is changed.

The motor driver 125 drives the first and second motors 123 and 124 under control by the video processor 130. The motor driver 125 may drive the first and second motors 123 and 124 to pan and tilt the PTZ camera 120, according to the driving pulse and the driving control signal which are outputted from the video processor 130.

The video processor 130 is connected to the fixed camera 110 and the PTZ camera 120. The video processor 130 is configured to receive the fixed camera image FIMG captured by the fixed camera 110 and the PTZ camera image PTZIMG captured by the PTZ camera 120, and process the received images FIMG and PTZIMG. For example, the video processor 130 may include various components for converting analog signals of the received images FIMG and PTZIMG into digital signals, adjusting the sizes of the received images FIMG and PTZIMG, adjusting the resolutions of the received images FIMG and PTZIMG, and performing other necessary processes. The images processed by the video processor 130 may be outputted through the input/output interface 140.

The video processor 130 may include a video calibrator 131 and a motor controller 132. The video calibrator 131 may receive a fixed camera image FIMG captured by the fixed camera 110. Furthermore, the video calibrator 131 may transmit a request signal to the motor controller 132 to move the PTZ camera 120, and simultaneously receive a plurality of PTZ camera images PTZIMG captured by the PTZ camera 120. For example, while the PTZ camera 120 is panned and/or tilted, the plurality of PTZ camera images PTZIMG may be obtained. Then, the video calibrator 131 may generate a panorama image by stitching the PTZ camera images PTZIMG. The fixed camera image FIMG and the panorama image may be outputted as a first image IMG1 and a second image IMG2 through the input/output interface 140.

In some embodiments, the panorama image may be generated by another component of the video processor 130, instead of the video calibrator 131.

The video calibrator 131 may receive the default value DPV associated with the aiming direction of the fixed camera 110 from the direction sensor 113. The video calibrator 131 may store the received default value DPV in the memory 150. The video calibrator 131 is configured to identify a reference window in the second image IMG2 according to the default value DPV, and detect an image area matched with the first image IMG1 within the reference window. The detected image area (hereafter, detected area) may have substantially the same size as the first image IMG1. The video calibrator 131 may output information associated with the detected area (hereafter, detected area information (DAI)) through the input/output interface 140. The video calibrator 131 may store the detected area information DAI as calibration information CLBI in the memory 150.

The external control device 30 (see FIG. 1) may receive the first image IMG1, the second image IMG2 and the detected area information DAI. The external control device 30 may display the first and second images IMG1 and IMG2 on the display device, and further highlight and display the detected area on the second image IMG2 according to the detected area information DAI. The external control device 30 may receive user inputs regarding changing the highlighted detected area and selecting the detected area as a calibration area, and provide a calibration command CLBCMD in response to the received user inputs.

The video calibrator 131 may store the detected area information DAI as calibration information CLBI in the memory 150 in response to the calibration command CLBCMD. The calibration information CLBI may include mapping information between the video coordinate associated with the fixed camera 110 and the video coordinate associated with the PTZ camera 120. When information regarding the change of the detected area is received with the calibration command CLBCMD, the video calibrator 131 may store the calibration information CLBI in the memory 150 based on one or more of the received information and the detected area information DAI.

The motor controller 132 may receive an area selection signal SS from other components of the input/output interface 140 or the video processor 130. The area selection signal SS may include data for selecting a partial image area of the fixed camera image FIMG. The motor controller 132 may identify a video coordinate associated with the PTZ camera 120, corresponding to an image area selected by the area selection signal SS, by referring to the calibration information CLBI, and control the first and second motors 123 and 124 through the motor driver 125 such that the PTZ camera 120 faces the identified video coordinate. Thus, the video capturing device 100 may capture the image area selected by the area selection signal SS, using the PTZ camera 120.

In accordance with the present embodiment, the video capturing device 100 may provide the first image IMG1 captured by the fixed camera 110 and the second image IMG2 acquired by performing image capturing while moving the PTZ camera 120, detect an image area matched with the first image IMG1 within the reference window specified in the second image IMG2 according to the default value DPV associated with the aiming direction of the fixed camera 110, and calibrate the PTZ camera 120 in association with the fixed camera 110 according to the detection result. The video capturing device 100 may compare a partial image corresponding to the reference window, not the entire image of the second image IMG2, to the first image IMG1. Thus, a relatively short time and/or a relatively small number of resources may be required for detecting the image area matched with the first image IMG1 in the second image IMG2, and the detected area may have relatively high reliability. When the video capturing device 100 is installed in an environment unsuitable for an image matching algorithm, for example, a space where similar structures are repeatedly positioned, the detecting of the image area matched with the first image IMG1 within the reference window of the second image IMG2 may grant higher reliability to the detection result. Furthermore, the detection result may be transmitted to the external control device 30 and help the user to perform calibration.

Figure 4:
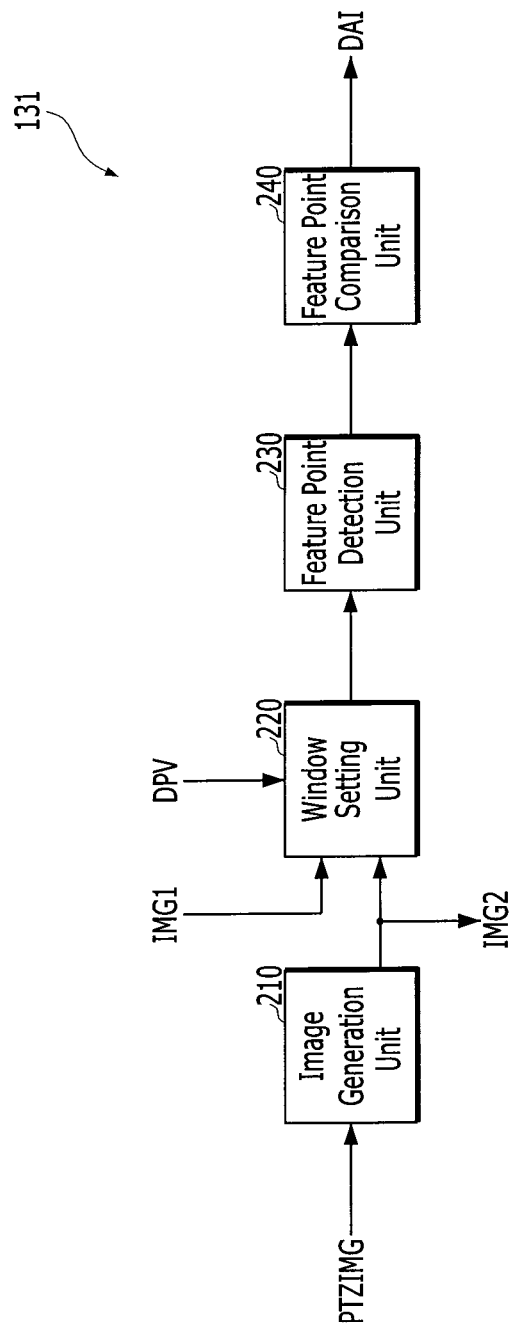
FIG. 4 is a block diagram illustrating an embodiment of a video calibrator of FIG. 3.
Figure 5:
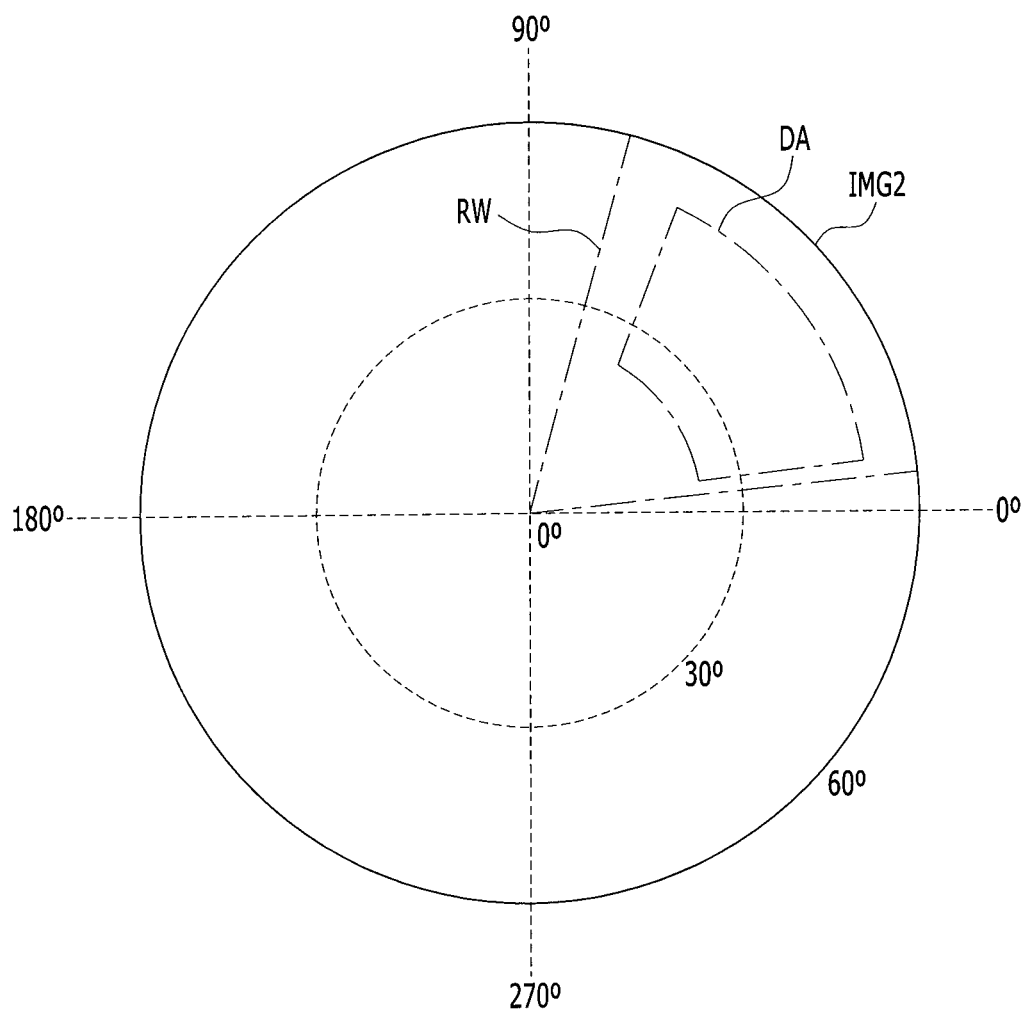
FIG. 5 is a diagram illustrating a panorama image and a reference window and a detected region which are displayed on the panorama image.

FIG. 4 is a block diagram illustrating an embodiment of the video calibrator of FIG. 3. FIG. 5 is a diagram illustrating a panorama image and a reference window and a detected region which are displayed on the panorama image.

Referring to FIGS. 4 and 5, the video calibrator 131 may include an image generation unit 210, a window setting unit 220, a feature point detection unit 230 and a feature point comparison unit 240.

The image generation unit 210 may receive the plurality of PTZ camera images PTZIMG which are acquired by performing image capturing while moving the PTZ camera 120, generate a panorama image by stitching the received PTZ camera images PTZIMG, and provide the generated panorama image as the second image IMG2 to the window setting unit 220. As described with reference to FIG. 3, the second image IMG2 may be outputted through the input/output interface 140.

As such, the second image IMG2 may be obtained by panning and/or tilting the PTZ camera 120. For example, the second image IMG2, which is obtained by panning the PTZ camera 120 in a range of 0 to 360 degrees while the tilt angle of the PTZ camera 120 is fixed to 30 degrees, may have a circular shape as illustrated in FIG. 5. For another example, when a panorama image is obtained by further tilting the PTZ camera 120 in a range of 0 to 60 degrees, the size of the second image IMG2 (for example, the diameter of the circular image) may be increased.

The window setting unit 220 may receive the first and second images IMG1 and IMG2 and the default value DPV. The window setting unit 220 is configured to define a reference window RW on the second image IMG2 according to the default value DPV. The second image IMG2 is a panorama image generated by stitching, and the first image IMG1 is a normal image. Thus, the first and second images IMG1 and IMG2 may have different scales. In this case, the window setting unit 220 may process the first image IMG1 to have the same scale as the second image IMG2, or process the second image IMG2 to have the same scale as the first image IMG1.

The feature point detection unit 230 is configured to extract features points from a portion of the second image IMG2, corresponding to the reference window RW, and the first image IMG1. The feature point comparison unit 240 is configured to compare the extracted feature points, and identify a detected area DA matched with the first image IMG1. The detected area DA is included in the reference window RW. The feature point comparison unit 240 may output the detected area information DAI.

FIG. 6 is a flowchart illustrating an operating method of a video capturing device in accordance with an embodiment of the disclosure.

Referring to FIGS. 3 and 6, the video capturing device 100 acquires a first image IMG1 from the fixed camera 110 in step S110. In step S120, the video capturing device 100 generates a second image IMG2 as a panorama image by stitching images which are acquired by performing image capturing while moving the PTZ camera 120.

In step S130, the video capturing device 100 identifies a reference window in the second image IMG2 according to the default value DPV associated with the aiming direction of the fixed camera 110, and searches an image area matched with the first image IMG1 in the reference window of the second image IMG2. The reference window may be identified and stored in the memory 150 in advance, and include information that specifies a partial area within the second image IMG2.

In step S140, the video capturing device 100 performs step S150 or S160, depending on whether the image area has been successfully detected. In step S150, the video capturing device 100 outputs detected area information DAI. The detected area information DAI may include information for specifying a partial area within the second image IMG2 or the reference window. The video capturing device 100 may calibrate the PTZ camera 120 for the fixed camera 110 according to the detected area information DAI. For example, the video capturing device 100 may store calibration information CLBI in the memory 150, the calibration information CLBI including a mapping relationship between a video coordinate associated with the fixed camera 110 and a video coordinate associated with the PTZ camera 120, based on the detected area information DAI.

In step S160, the video capturing device 100 outputs the reference window information.

FIG. 7 is a flowchart illustrating step S150 of FIG. 6 in more detail.

Referring to FIG. 7, the video capturing device 100 outputs the first image IMG1, the second image IMG2 and the detected area information DAI in step S151. The external control device 30 receives the first and second images IMG1 and IMG2 and the detected area information DAI from the video capturing device 100 through the network, and displays the first and second images IMG1 and IMG2 on the display device. At this time, the external control device 30 may further highlight and display the detected area on the second image IMG2 according to the detected area information DAI.

FIG. 8 is a flowchart illustrating step S160 of FIG. 6 in more detail.

Referring to FIG. 8, the video capturing device 100 outputs a first video captured by the fixed camera 110, a second video captured by the PTZ camera 120 and the reference window information in step S161. At this time, the second video may be acquired by controlling the PTZ camera 120 to aim at the video coordinate corresponding to the reference window, and performing image capturing through the PTZ camera 120.

The external control device 30 may receive the first and second videos and the reference window information from the video capturing device 100 through the network, and display the first and second videos on the display device. According to the reference window information, the external control device 30 may further highlight and display the reference window on the second video. When the searching of the detected area fails, the reference window information and the videos captured by the cameras 110 and 120 may be provided to the external control device 30, such that a user can check the videos in real time and select an image area of the second video, corresponding to the first video, by referring to the reference window information.

Figure 9:
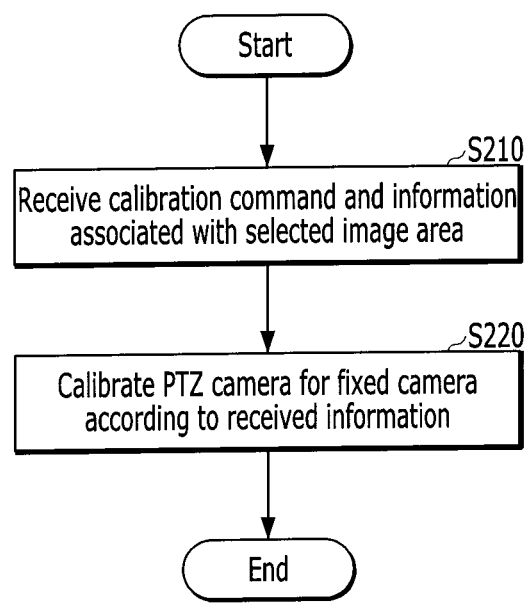
FIG. 9 is a flowchart illustrating a method for calibrating a video coordinate associated with a PTZ camera with respect to a video coordinate associated with a fixed camera, in response to a calibration command.

FIG. 9 is a flowchart illustrating a method for calibrating a video coordinate associated with the PTZ camera in association with a video coordinate associated with the fixed camera, in response to the calibration command.

Referring to FIGS. 3 and 9, the video capturing device 100 may receive the calibration command CLBCMD and information associated with the image area selected by the user from the external control device 30, in step S210. The information associated with the selected image area may include information for specifying the selected image area on the second image IMG2 or the second video described with reference to FIG. 8. The information associated with the selected image area may include information associated with a change between the selected image area and the detected area specified by the detected area information DAI.

In step S220, the video capturing device 100 may calibrate the PTZ camera 120 for the fixed camera 110 according to the received information. When the calibration command CLBCMD and the information associated with the selected image area are received, the video capturing device 100 may store the calibration information CLBI in the memory 150, the calibration information CLBI including the mapping relationship between the video coordinate associated with the fixed camera 110 and the video coordinate associated with the PTZ camera 120, based on the information associated with the selected image area and/or the detected area information DAI. When the calibration command CLBCMD is received without the information associated with the selected image area, the video capturing device 100 may store the calibration information CLBI in the memory 150, the calibration information CLBI including the mapping relationship between the video coordinate associated with the fixed camera 110 and the video coordinate associated with the PTZ camera 120, based on the detected area information DAI.

In the calibration method in accordance with the present embodiment, the video capturing device 100 may provide the first image IMG1 captured by the fixed camera 110 and the second image IMG2 acquired by performing image capturing while moving the PTZ camera 120, detect an image area matched with the first image IMG1 within the reference window specified in the second image IMG2 according to the default value DPV associated with the aiming direction of the fixed camera 110, and calibrate the PTZ camera 120 in association with the fixed camera 110 according to the detection result. The video capturing device 100 may compare a partial image corresponding to the reference window, not the entire image of the second image IMG2, to the first image IMG1. Thus, a relatively short time and/or a relatively small number of resources may be required for detecting the image area matched with the first image IMG1 in the second image IMG2, and the detected area may have relatively high reliability. Furthermore, the detection result may be transmitted to the external control device 30 and help the user to perform calibration.

Figure 10:
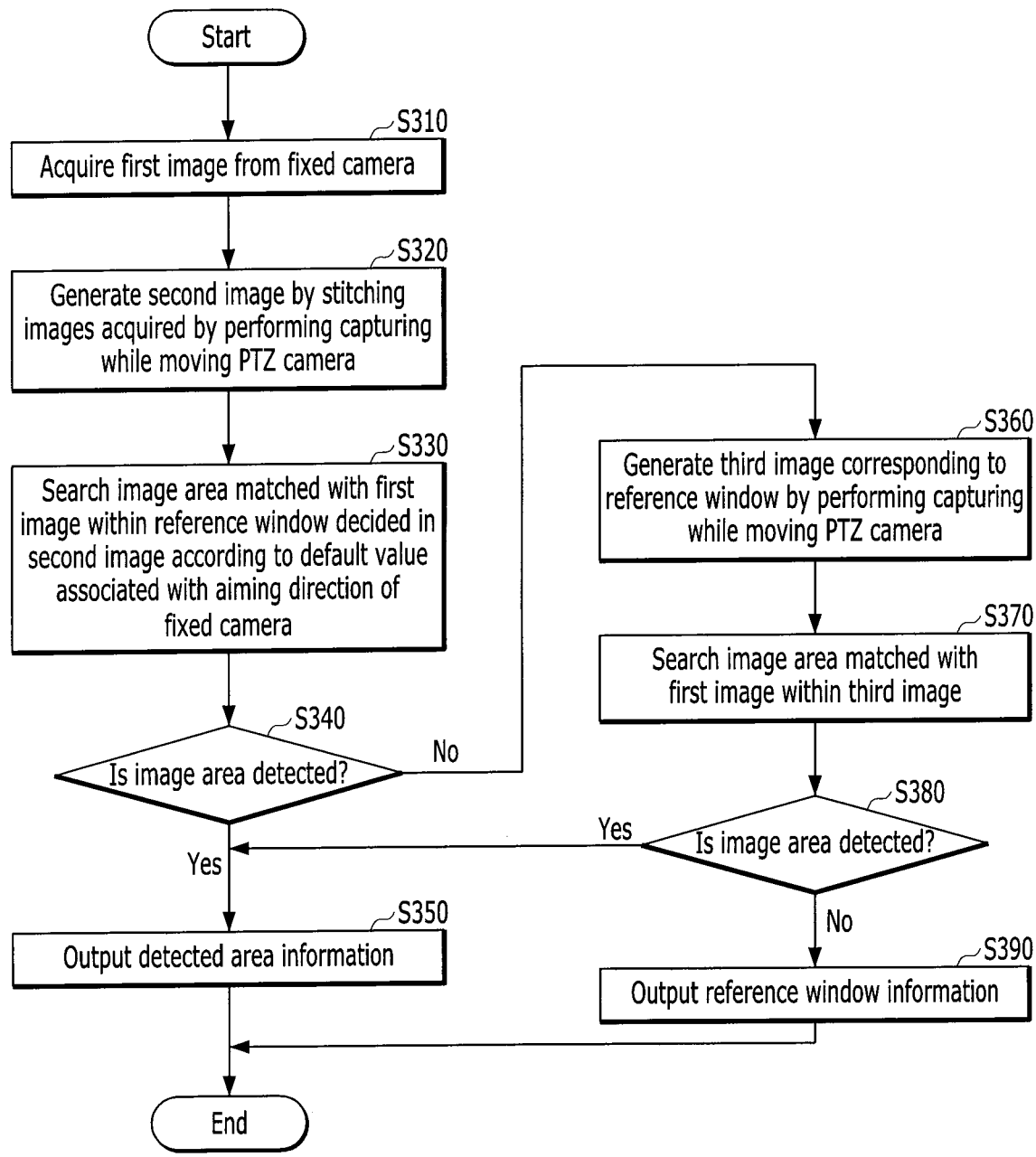
FIG. 10 is a flowchart illustrating an operating method of a video capturing device in accordance with another embodiment of the disclosure.

FIG. 10 is a flowchart illustrating an operating method of a video capturing device in accordance with another embodiment of the disclosure.

Referring to FIGS. 3 and 10, steps S310 to S340 may be performed in the same manner to steps S110 to S140 described with reference to FIG. 6. Hereafter, the overlapping descriptions will be omitted.

In step S350, the video capturing device 100 outputs the detected area information DAI. When step S350 is performed after step S340, the first and second images IMG1 and IMG2 may be further outputted as described with reference to FIG. 7. At this time, the detected area information DAI may include information for specifying a partial area within the second image IMG2.

In step S360, the video capturing device 100 generates a third image corresponding to the reference window by performing image capturing while moving the PTZ camera 120. The video capturing device 100 may read the default value DPV, control the PTZ camera 120 to aim at a video coordinate corresponding to the reference window according to the default value DPV, and perform video capturing through the PTZ camera 120, thereby acquiring the third image. In some embodiments, the video capturing device 100 may pan and tilt the PTZ camera 120 while maintaining a proper zoom magnification, and perform video capturing while controlling the PTZ camera 120 to sequentially aim at video coordinates corresponding to the reference window in a zigzag manner, for example, thereby acquiring a plurality of PTZ camera images PTZIMG. The video capturing device 100 may acquire the third image by stitching the plurality of acquired PTZ camera images PTZIMG. In this case, the third image may have higher resolution than the second image IMG2.

In step S370, the video capturing device 100 searches an image area matched with the first image IMG1 within the third image. The video capturing device 100 may extract feature points from the first image IMG1 and the third image, and identify a detected area matched with the first image IMG1 in the third image by comparing the extracted feature points. Since the third image has higher resolution than the second image IMG2, the probability that the image area will be detected in step S370 may be higher than that in step S340.

In step S380, the video capturing device 100 performs step S350 or S390, depending on whether the image area has been successfully detected. In step S350, the video capturing device 100 outputs the detected area information DAI. When step S350 is performed after step S380, the first image IMG1 and the third image may be further outputted. At this time, the detected area information DAI may include information for specifying a partial area within the third image.

In step S390, the video capturing device 100 outputs the reference window information. At this time, the first video captured by the fixed camera 110 and the second video captured by the PTZ camera 120 may be further outputted as described with reference to FIG. 8.

Figure 11:
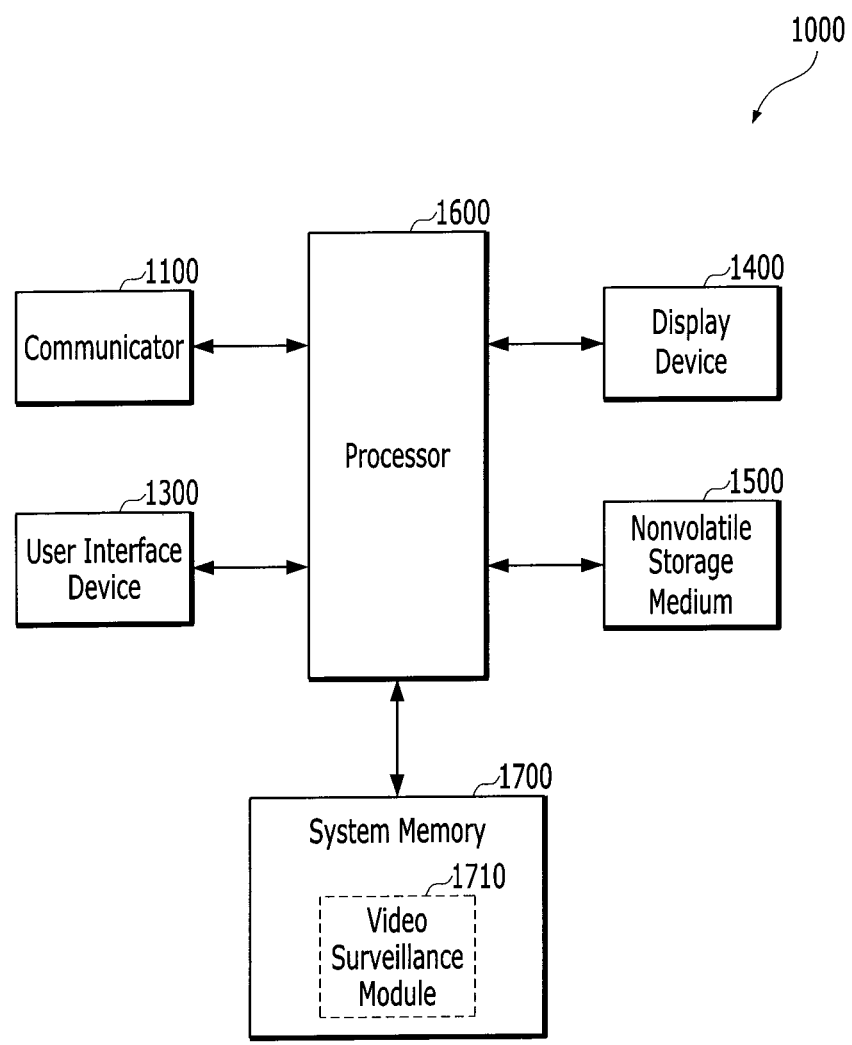
FIG. 11 is a block diagram illustrating an external control device in accordance with an embodiment of the disclosure.

FIG. 11 is a block diagram illustrating an external control device in accordance with an embodiment of the disclosure.

Referring to FIG. 11, an external control device 1000 includes a communicator 1100, a user interface device 1300, a display device 1400, a nonvolatile storage medium 1500, a processor 1600 and a system memory 1700.

The communicator 1100 may transmit and receive signals between the external control device 1000 and the video capturing device 100 (see FIG. 3) through a network.

The user interface device 1300 receives a user input for controlling operations of the external control device 1000 or the processor 1600. The user interface device 1300 may include a key pad, a dome switch, a touch pad (static/capacitive), a jog wheel, a jog switch, a finger mouse and the like.

The display device 1400 operates in response to control by the processor 1600. The display device 1400 displays information processed by the external control device 1000 or the processor 1600. For example, the display device 1400 may display an image under control by the processor 1600.

The nonvolatile storage medium 1500 may be at least one of a flash memory, a hard disk, a multimedia card and the like. The nonvolatile storage medium 1500 is configured to write/read data in response to control by the processor 1600.

The processor 1600 may include any one of a general-purpose processor and a dedicated processor, and control operations of the communicator 1100, the user interface device 1300, the display device 1400, the nonvolatile storage medium 1500 and the system memory 1700.

The processor 1600 is configured to load program codes from the nonvolatile storage medium 1500 to the system memory 1700, and execute the loaded program codes, the program codes including commands for providing various functions when the commands are executed. The processor 1600 may load a video surveillance module 1710 including commands and/or program codes from the nonvolatile storage medium 1500 to the system memory 1700, and execute the loaded video surveillance module 1710. The video surveillance module 1710 may display an image and/or video received from the video capturing device 100 on the display device 1400, and detect an associated user input. The video surveillance module 1710 may display an additional user interface on the display device 1400, and detect a user input through the user interface. The video surveillance module 1710 will be described in more detail with reference to FIG. 12.

The system memory 1700 may be provided as a working memory of the processor 1600. FIG. 8 illustrates the system memory 1700 as a component separated from the processor

1600. However, this is only an example, and at least a part of the system memory 1700 may be merged into the processor 1600.

The system memory 1700 may include one or more of a RAM (Random Access Memory), a ROM (Read Only Memory) and other types of computer readable storage media.

Figure 12:
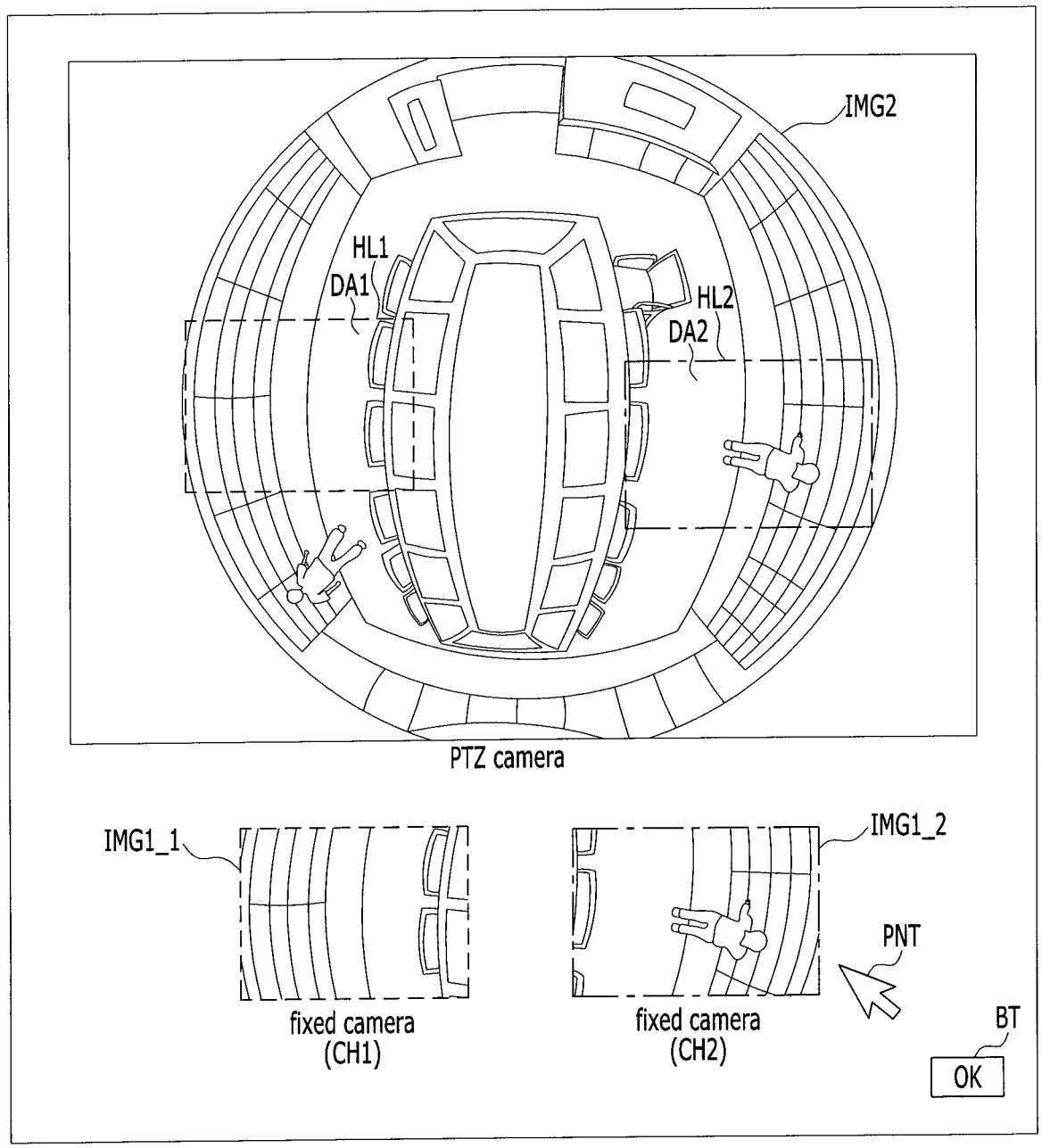
FIG. 12 is a diagram illustrating an example of a screen displayed on the external control device.

FIG. 12 is a diagram illustrating an example of a screen displayed on the external control device. The descriptions with reference to FIG. 12 will be based on the supposition that images and/or videos are received from fixed cameras of two channels CH1 and CH2.

Referring to FIGS. 11 and 12, the video surveillance module 1710 displays images on separated areas, the images including an image IMG1_1 captured by the fixed camera of the first channel CH1, an image IMG1_2 captured by the fixed camera of the second channel CH2, and an image IMG2 acquired by performing image capturing while moving the PTZ camera.

The video surveillance module 1710 may highlight a first detected area DA1 and a second detected area DA2 according to the detected area information DAI (see FIG. 3) from the video capturing device 100 (see FIG. 3). The first detected area DA1 is an area matched with the image IMG1_1 of the fixed camera of the first channel CH1, and the second detected area DA2 is an area matched with the image IMG1_2 of the fixed camera of the second channel CH2. The video surveillance module 1710 may highlight the image IMG1_1 of the fixed camera of the first channel CH1 in the same manner as the first detected area DA1, and highlight the image IMG1_2 of the fixed camera of the second channel CH2 in the same manner as the second detected area DA2. Through such highlights, the user may easily recognize the first and second detected areas DA1 and DA2 and the images IMG1_1 and IMG1_2 of the fixed cameras, corresponding to the first and second detected areas DA1 and DA2.

The video surveillance module 1710 may display the images IMG1_1 and IMG1_2 of the first and second channels CH1 and CH2 in response to first user inputs, such that the images IMG1_1 and IMG1_2 overlap the first and second detected areas DA1 and DA2, respectively. In some embodiments, the first user inputs may include inputs of dragging and dropping the images IMG1_1 and IMG1_2 of the first and second channels CH1 and CH2 into the first and second detected areas DA1 and DA2, respectively, using a pointer PNT. In other embodiments, the first user inputs may include inputs that select the images IMG1_1 and IMG1_2 of the first and second channels CH1 and CH2 or the first and second detected areas DA1 and DA2 a plurality of times within a predetermined time period, using the pointer PNT.

The video surveillance module 1710 may transmit the calibration command CLBCMD to the video capturing device 100 in response to a second user input for selecting a button BT disposed on a part of the screen through the pointer PNT, with the images IMG1_1 and IMG1_2 overlapping the image IMG2.

The video surveillance module 1710 may change the first and second detected areas DA1 and DA2 in response to a third user input, with the images IMG1_1 and IMG_2 overlapping the image IMG2. For example, the third user input may include inputs of moving the images IMG1_1 and IMG1_2 through the pointer PNT, with the images IMG1_1 and IMG1_2 overlapping the first and second detected areas DA1 and DA2, and changing the sizes of the images IMG1_1 and IMG1_2 through the pointer PNT. The areas of the image IMG2, overlapped by the images IMG1_1 and IMG1_2, may be selected as the changed first and second detected areas DA1 and DA2, respectively. Then, the video surveillance module 1710 may transmit the calibration command CLBCMD and information associated with the changed first and second detected areas DA1 and DA2 to the video capturing device 100 in response to the second user input of selecting the button BT.

As described above, when the video capturing device 100 fails to search a detected area, the video surveillance module 1710 may receive the videos captured by the fixed cameras of the first and second channels CH1 and CH2, the video captured by the PTZ camera 120, and the reference window information from the video capturing device 100. In this case, the video surveillance module 1710 may display the received videos in the same manner as the images IMG1_1, IMG1_2 and IMG2. At this time, the video surveillance module 1710 may further highlight and display the reference window on the video captured by the PTZ camera 120. The video surveillance module 1710 may display the videos of the fixed cameras in response to the above-described first user inputs, such that the videos overlap the reference window. Furthermore, the video surveillance module 1710 may transmit information to the video capturing device 100 in response to the above-described second user inputs, the information associated with the parts overlapped by the videos of the fixed cameras in the video of the PTZ camera 120. The video surveillance module 1710 may change the areas of the videos of the fixed cameras, overlapping the reference window, in response to the above-described third user input.

Figure 13:
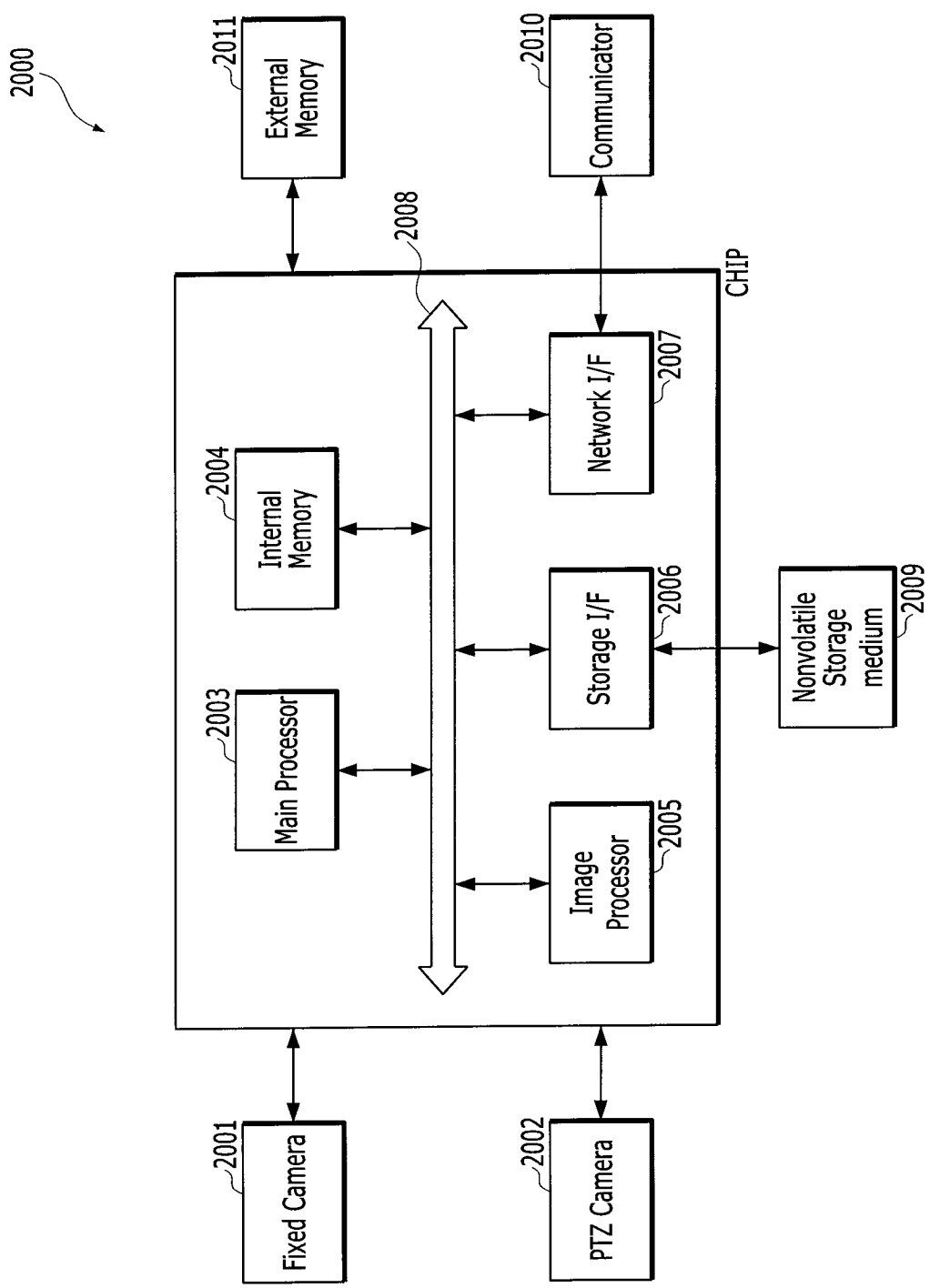
FIG. 13 is a block diagram illustrating an exemplary computer device for implementing the video capturing device of FIG. 3.

FIG. 13 is a block diagram illustrating an exemplary computer device for implementing the video capturing device of FIG. 3.

Referring to FIG. 13, a computer device 2000 may include a fixed camera 2001, a PTZ camera 2002, a main processor 2003, an internal memory 2004, an image processor 2005, a storage interface 2006, a network interface 2007, a bus 2008, a nonvolatile storage medium 2009, a communicator 2010 and an external memory 2011.

The fixed camera 2001 and the PTZ camera 2002 are configured in the same manner as the fixed camera 110 and the PTZ camera 120 of FIG. 3. Hereafter, the overlapping descriptions will be omitted.

The main processor 2003 may be at least one of a general-purpose processor and a dedicated processor, and control overall operations of the computer device 2000.

The internal memory 2004 may store computer programs and/or commands to be executed by the main processor 2003. For example, the internal memory 2004 may be provided as a working memory of the main processor 2003. The internal memory 2004 may be provided as the memory 150 of FIG. 3. The internal memory 2004 may be at least one combination of a RAM, a ROM and other types of computer readable media.

The image processor 2005 may perform the functions of the video processor 130, which have been described with reference to FIG. 3. In some embodiments, each of the video calibrator 131 and the motor controller 132 may be implemented in software, hardware, firmware or combinations thereof. When the video calibrator 131 and the motor controller 132 are implemented in software, the image processor 2005 may load software modules to the internal memory 2004 and execute the loaded software modules. The software modules may include a software module that provides the functions of the video calibrator 131 when executed by the image processor 2005 and a software module that provides the functions of the motor controller 132 when executed by the image processor 2005. Such software modules may be loaded from the nonvolatile storage media 2009. In FIG. 13, the internal memory 2004 may be isolated from the image processor 2005. However, this is only an example, and at least a part of the internal memory 2004 may be provided as a component included in the image processor 2005.

In some embodiments, the motor controller 132 may also be provided as a component separated from the image processor 2005.

The storage interface 2006 interfaces the components of the nonvolatile storage medium 2009 and the computer device 2000. The storage interface 2006 may operate in response to control by the main processor 2003 and/or the image processor 2005.

The network interface 2007 interfaces the components of the communicator (or transceiver) 2010 and the computer device 2000. The network interface 2007 may operate in response to control by the main processor 2003. The main processor 2003 may transmit data outputted from the image processor 2005 to the external control device 1000 through the communicator 2010.

The bus 2008 connects the components of the computer device 2000 for communication of data, signals and information. The bus 2008 may function as the input/output interface 140 of FIG. 3.

The nonvolatile storage medium 2009 may be one of various types of storage media, such as a flash memory, hard disk and multimedia card, which retain data even though power is removed. The nonvolatile storage medium 2009 is configured to write/read data in response to control by the main processor 2003. In some embodiments, the nonvolatile storage medium 2009 may be provided as the memory 150 of FIG. 3.

The communicator 2010 may transmit and receive signals between the external control device 1000 and the computer device 2000 through the network.

In some embodiments, the main processor 2003, the internal memory 2004 and the image processor 2005 may be integrated as one semiconductor chip CHIP. The semiconductor chip CHIP may further include a storage interface 2006 and a network interface 2007.

The computer device 2000 may further include an external memory 2011. The external memory 2011 may provide an additional storage space to components within the computer device 2000, such as the main processor 2003 and the image processor 2005. The external memory 2011 may be detachably provided in the computer device 2000.

In accordance with the embodiments of the present disclosure, it is possible to provide a video capturing device capable of matching video coordinates of cameras with high accuracy, and an image capturing system including the same.

While various embodiments have been described above, it will be understood to those skilled in the art that the embodiments described are by way of example only. Accordingly, the disclosure described herein should not be limited based on the described embodiments.

What is claimed is:

1. A video capturing device comprising:
one or more fixed cameras;
a PTZ camera which is capable to pant, tilt, or zoom;
a video calibrator connected to the one or more fixed cameras and the PTZ camera; and
a direction sensor disposed in association with the fixed cameras to detect an aiming direction of the fixed camera to generate a default value,
wherein the video calibrator receives a first image captured by the one or more fixed cameras and a second image acquired by performing image capturing while moving the PTZ camera, searches an image area matched with the first image within a reference window which is specified in the second image, and generates information of the searched image area,
wherein the video calibrator identifies the reference window in the second image according to the default value associated with the aiming direction of the fixed camera detected by the direction sensor.

2. The video capturing device of claim 1, wherein the second image comprises a panorama image acquired by stitching a plurality of images which are captured while moving the PTZ camera.

3. The video capturing device of claim 1, further comprising
a support member; and
a moving member coupled to the one or more fixed cameras, the direction sensor, and the support member, and configured to adjust the aiming direction by moving the one or more fixed cameras,
wherein the default value is decided by the movement of the one or more fixed cameras.

4. The video capturing device of claim 1, further comprising one or more sensors disposed in the one or more fixed cameras and configured to detect the default value.

5. The video capturing device of claim 1, wherein the video calibrator comprises:
a window setter configured to define the reference window according to the default value;
a feature point detector configured to extract feature points from a portion of the second image, corresponding to the reference window, and the first image, respectively; and
a feature point comparator configured to detect the image area matched with the first image by comparing the extracted feature points.

6. The video capturing device of claim 1, wherein the video calibrator maps a video coordinate associated with the PTZ camera, corresponding to the searched image area, to a video coordinate associated with the one or more fixed cameras.

7. The video capturing device of claim 1, wherein when the video capturing device receives information associated with a change of the searched image area, the video calibrator maps a video coordinate associated with the PTZ camera to a video coordinate associated with the one or more fixed cameras based on the information associated with the change.

8. The video capturing device of claim 1, wherein the video calibrator outputs information associated with the reference window to outside of the video capturing device when the searching of the image area fails, and maps a video coordinate associated with the PTZ camera, corresponding to a portion of the reference window, to a video coordinate associated with the one or more fixed cameras, when the video capturing device receives information for selecting the portion of the reference window.

9. The video capturing device of claim 1, wherein the video calibrator receives a third image acquired by performing image capturing while moving the PTZ camera, when the searching of the image area fails, wherein the third image corresponds to the reference window,
wherein the video calibrator searches an image area matched with the first image in the third image, and outputs information associated with the image area matched with the first image in the third image.

10. A video capturing system comprising:
one or more fixed cameras;
a PTZ camera which is capable to pant, tilt, or zoom;
a video calibrator connected to the one or more fixed cameras and the PTZ camera;
a direction sensor disposed in association with the fixed cameras to detect an aiming direction of the fixed camera to generate a default value; and
a video surveillance device configured to display videos captured by the one or more fixed cameras and the PTZ camera on a display device,
wherein the video calibrator receives a first image captured by the one or more fixed cameras and a second image acquired by performing image capturing while moving the PTZ camera, and searches an image area matched with the first image within a reference window which is specified in the second image,
wherein the video calibrator identifies the reference window in the second image according to the default value associated with the aiming direction of the fixed camera detected by the direction sensor, and
wherein when the searching of the image area succeeds, the video surveillance device displays the first image and the second image on the display device, and further highlights and displays the searched image area on the second image.

11. The video capturing system of claim 10, wherein the video surveillance device further highlights and displays the first image, wherein the highlight for the first image is the same manner as the highlight for the searched image area.

12. The video capturing system of claim 10, further comprising a user interface,
wherein the video surveillance device displays the first and second images on a first area and a second area of the display device, respectively, which are separated from each other, and displays the first image to overlap the searched image area when a first user input is received through the user interface.

13. The video capturing system of claim 12, wherein the first user input comprises an input of dragging and dropping the first image into at least a portion of the searched image area.

14. The video capturing system of claim 12, wherein the first user input comprises an input of selecting the first image a plurality of times within a predetermined time period.

15. The video capturing system of claim 12, wherein the video surveillance device transmits a command signal to the video calibrator in response to a second user input received through the user interface, with the first image overlapping the searched image area,
wherein the video calibrator maps a video coordinate associated with the PTZ camera, corresponding to the searched image area, to a video coordinate associated with the one or more fixed cameras, in response to the command signal.

16. The video capturing system of claim 12, wherein the video surveillance device changes and displays an area corresponding to the first image on the second image in response to the second input received through the user interface, with the first image overlapping the searched image area.

17. The video capturing system of claim 16, wherein with the area corresponding to the first image changed on the second image, the video surveillance device provides information associated with the change to the video calibrator in response to a third user input received through the user interface,
wherein the video calibrator maps a video coordinate associated with the PTZ camera to a video coordinate associated with the one or more fixed cameras, based on the information associated with the change.

18. The video capturing system of claim 10, wherein when the searching of the image area fails, the video surveillance device displays a first video captured by the one or more fixed cameras and a second video captured by the PTZ camera on the display device, and further highlights and displays the reference window on the second video.

19. The video capturing system of claim 18, further comprising a user interface,
wherein the video surveillance device displays the first and second videos on a first area and a second area of the display device, respectively, which are separated from each other, and displays the first video to overlap the reference window when a first user input is received through the user interface.

20. The video capturing system of claim 19, wherein the video surveillance device transmits information on an overlap area between the second video and the first video to the video calibrator, in response to a second user input received through the user interface, with the first image overlapping the reference window,
wherein the video calibrator maps a video coordinate associated with the PTZ camera, corresponding to the overlap area between the second video and the first video, to a video coordinate associated with the one or more fixed cameras.

* * * * *